US012407970B2

(12) United States Patent
Takahashi

(10) Patent No.: US 12,407,970 B2
(45) Date of Patent: Sep. 2, 2025

(54) WIRELESS HEADPHONE AND METHOD FOR CONTROLLING WIRELESS HEADPHONE

(71) Applicant: PANASONIC INTELLECTUAL PROPERTY MANAGEMENT CO., LTD., Osaka (JP)

(72) Inventor: Takeshi Takahashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 110 days.

(21) Appl. No.: 17/970,106

(22) Filed: Oct. 20, 2022

(65) Prior Publication Data

US 2023/0224624 A1 Jul. 13, 2023

(30) Foreign Application Priority Data

Jan. 11, 2022 (JP) ................................ 2022-002420

(51) Int. Cl.
*H04R 1/10* (2006.01)

(52) U.S. Cl.
CPC ......... *H04R 1/1041* (2013.01); *H04R 1/1025* (2013.01); *H04R 2420/07* (2013.01)

(58) Field of Classification Search
CPC . H04R 1/1041; H04R 1/1025; H04R 2420/07
See application file for complete search history.

(56) References Cited

U.S. PATENT DOCUMENTS

| | | | | |
|---|---|---|---|---|
| 9,967,649 B2 * | 5/2018 | Chandramohan | .... | H04R 1/1016 |
| 9,973,621 B2 * | 5/2018 | Xian | ....................... | G06F 21/12 |
| 10,394,521 B1 * | 8/2019 | Cramer | .................. | H03G 5/025 |
| 11,895,455 B2 * | 2/2024 | Arakawa | .............. | H04R 1/1016 |
| 2007/0160255 A1 * | 7/2007 | Cheng | .................. | H04R 1/1016 381/384 |

(Continued)

FOREIGN PATENT DOCUMENTS

| | | |
|---|---|---|
| EP | 3499910 A1 | 6/2019 |
| EP | 3879845 A1 | 9/2021 |

(Continued)

OTHER PUBLICATIONS

Extended European Search Report, dated Jun. 14, 2023, for European Patent Application No. 22203320.1-1207. (7 pages).

(Continued)

*Primary Examiner* — Oyesola C Ojo
(74) *Attorney, Agent, or Firm* — Seed Intellectual Property Law Group LLP

(57) ABSTRACT

A wireless headphone includes a wireless communication unit configured to perform wireless communication with an external terminal, a detection unit configured to detect whether the wireless headphone is worn on an ear of a user, an input detection unit configured to detect an input operation of the user, and a control unit configured to transition, based on detection of a specific input operation from the user by the input detection unit in a state that the detection unit detects that the wireless headphone is not worn on the ear, an operation mode to a pairing mode in which pairing related to the wireless communication with the external terminal is performed.

8 Claims, 8 Drawing Sheets

(56) References Cited

U.S. PATENT DOCUMENTS

| | | | | |
|---|---|---|---|---|
| 2010/0020982 | A1 | 1/2010 | Brown et al. | |
| 2011/0286615 | A1* | 11/2011 | Olodort | H04R 1/1025 381/311 |
| 2013/0183939 | A1* | 7/2013 | Kakehi | H04W 12/08 455/411 |
| 2015/0230022 | A1* | 8/2015 | Sakai | H04R 1/1041 381/58 |
| 2017/0094396 | A1* | 3/2017 | Chandramohan | H04R 5/033 |
| 2017/0359644 | A1* | 12/2017 | Cramer | H04R 1/1008 |
| 2018/0091887 | A1* | 3/2018 | Minoo | H04R 1/1091 |
| 2019/0090135 | A1* | 3/2019 | Milevski | H04W 12/06 |
| 2022/0039179 | A1* | 2/2022 | Chen | H04R 1/1016 |
| 2023/0259324 | A1* | 8/2023 | Sugimori | G06F 3/0488 345/173 |
| 2023/0328419 | A1* | 10/2023 | Karp | H04R 1/1016 381/380 |
| 2024/0430352 | A1* | 12/2024 | Kim | H04R 1/1025 |

FOREIGN PATENT DOCUMENTS

| | | | |
|---|---|---|---|
| WO | 2012053289 | A1 | 4/2012 |
| WO | 2021164556 | A1 | 8/2021 |

OTHER PUBLICATIONS

Communication pursuant to Article 94(3) EPC, dated Jul. 11, 2025, for European Patent Application No. 22203320.1. (6 pages).

* cited by examiner

WIRELESS HEADPHONE AND METHOD FOR CONTROLLING WIRELESS HEADPHONE

CROSS-REFERENCE TO RELATED APPLICATIONS

This application is based on and claims priority under 35 USC 119 from Japanese Patent Application No. 2022-002420 filed on Jan. 11, 2022, the contents of which are incorporated herein by reference.

TECHNICAL FIELD

The present disclosure relates to a wireless headphone and a method for controlling the wireless headphone.

BACKGROUND ART

U.S. Pat. No. 9,967,649B discloses a case in which a pair of wireless headphones can be stored. The case includes a lid and a lid sensor that generates a detection signal when the lid moves from a closed position to an open position. Further, the case transmits signals to the wireless headphones to turn on the wireless headphones in response to reception of the detection signal, and starts a pairing sequence between the wireless headphones and an electronic device in response to an input (for example, opening and closing of the lid, and pressing of an input button provided on the case) by a user.

In U.S. Pat. No. 9,967,649B, there is a problem that, when the input by the user is opening and closing of the lid, and the pairing sequence between the wireless headphones and the electronic device is started by the opening and closing of the lid, the pairing sequence between the wireless headphones and the electronic device (for example, a smartphone) is started when, for example, the opening and closing of the lid not intended by the user is detected. Alternatively, there is a problem that, when the input by the user is pressing of the input button provided on the case, it is necessary to separately provide the input button for starting the pairing sequence in the case, and an increase in a material cost of the case cannot be avoided. In any problem, in a configuration of U.S. Pat. No. 9,967,649B, it is difficult for the user to start the pairing sequence between the electronic device and the wireless headphones at a necessary timing while preventing the increase in the material cost.

SUMMARY OF INVENTION

The present disclosure has been devised in view of the above-described circumstances in the related art, and an object thereof is to provide a wireless headphone and a method for controlling the wireless headphone that support a user to start a pairing sequence between an electronic device and the wireless headphone at a necessary timing while preventing an increase in a material cost.

According to an aspect of the present disclosure, there is provided a wireless headphone including: a wireless communication unit configured to perform wireless communication with an external terminal, a detection unit configured to detect whether the wireless headphone is worn on an ear of a user, an input detection unit configured to detect an input operation of the user, and a control unit configured to transition, based on detection of a specific input operation from the user by the input detection unit in a state that the detection unit detects that the wireless headphone is not worn on the ear, an operation mode to a pairing mode in which pairing related to the wireless communication with the external terminal is performed.

According to an aspect of the present disclosure, there is provided a method for controlling a wireless headphone that performs wireless communication with an external terminal, the method including: detecting whether the wireless headphone is worn on an ear of a user, detecting an input operation of the user, and transitioning, based on detection of a specific input operation from the user in a state that it is detected that the wireless headphone is not worn on the ear, an operation mode to a pairing mode in which pairing related to the wireless communication with the external terminal is performed.

According to the present disclosure, it is possible to support a user to start a pairing sequence between an electronic device and the wireless headphones at a necessary timing while preventing an increase in a material cost.

DESCRIPTION OF EMBODIMENTS

Background of Embodiment

Figure 1:
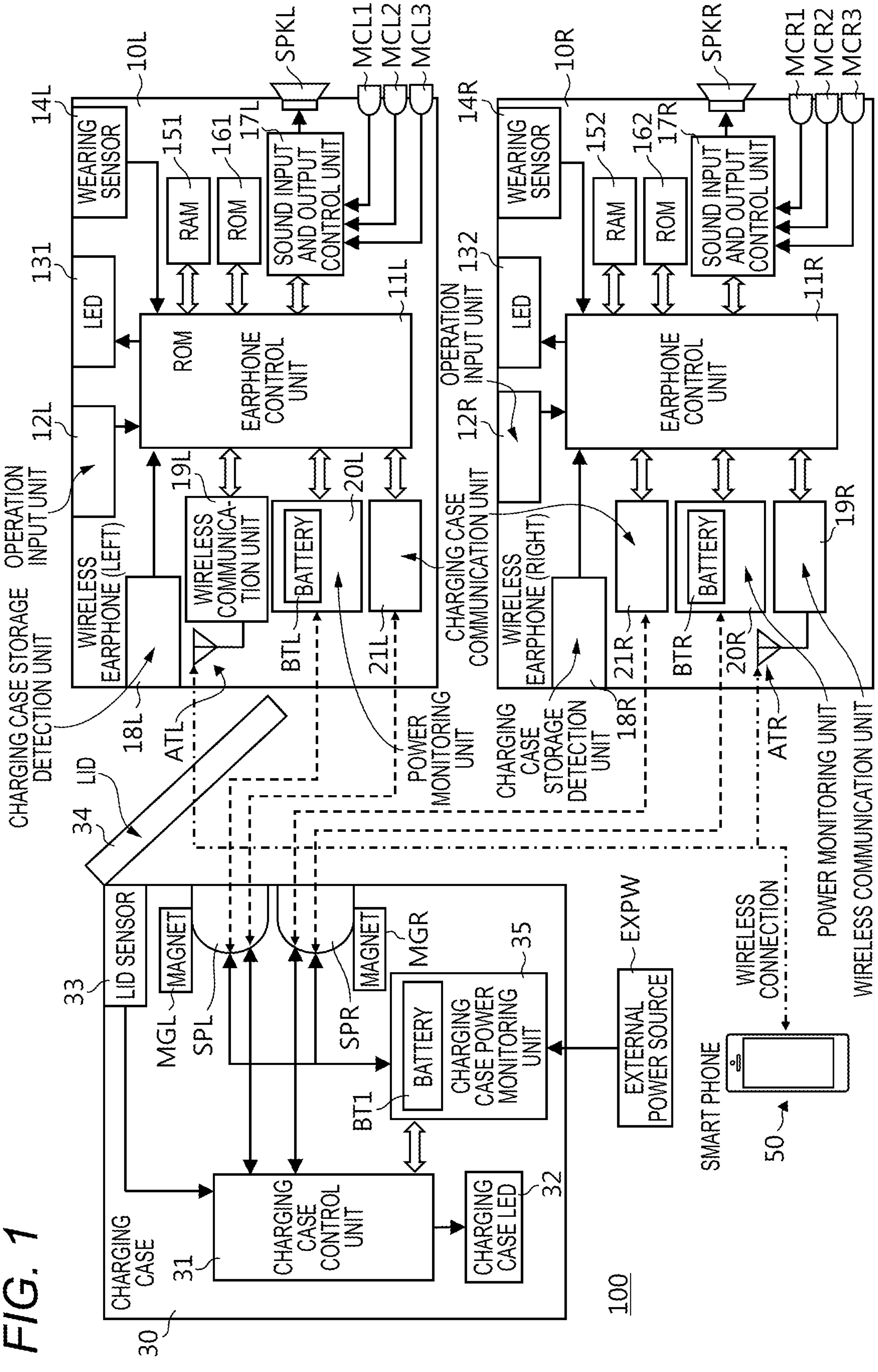
FIG. 1 is a block diagram illustrating a system configuration example of a wireless communication system according to a first embodiment.

In U.S. Pat. No. 9,967,649B, there is a problem that, when the input by the user is opening and closing of the lid, and the pairing sequence between the wireless headphones and the electronic device is started by the opening and closing of the lid, the pairing sequence between the wireless headphones and the electronic device (for example, a smartphone) is started when, for example, the opening and closing of the lid not intended by the user is detected. Alternatively, there is a problem that, when the input by the user is pressing of the input button provided on the case, it is necessary to separately dispose an input button for starting the pairing sequence in the case, and an increase in a material cost of the case cannot be avoided. In any problem, in a configuration of U.S. Pat. No. 9,967,649B, it is difficult for the user to start the pairing sequence between the electronic device and the wireless headphones at a necessary timing while preventing the increase in the material cost.

Therefore, the following embodiment describes an example of wireless headphones and a method for controlling the wireless headphones that support a user to start a pairing sequence between an electronic device and the wireless headphones at a necessary timing while preventing an increase in a material cost.

Meanwhile, in a configuration of WO2012/053289, there is a problem that processing on a portable device is not executed unless an earphone is worn on an ear because the portable device corresponding to an operation set to be valid cannot be controlled unless the earphone is worn. For this reason, it is necessary to assign one operation to one operation function of the portable device that does not operate unless the earphone is being worn, and it is difficult to assign many operation functions, or it is necessary to request a user to perform the complicated operations in order to assign many operation functions, which means improvement in convenience cannot be expected.

Therefore, the following embodiment describes an example of headphones and a method for controlling the headphones in which different operation functions are executed depending on wearing states of the user even with the same operation to improve the convenience of the user.

Hereinafter, the embodiment specifically describing the wireless headphones and the method for controlling the wireless headphones according to the present disclosure will be described in detail with reference to the drawings as appropriate. However, unnecessarily detailed descriptions may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

A wireless communication system according to a first embodiment provides wireless communication (for example, Bluetooth (registered trademark)) used in wireless earphones called True Wireless Stereo (TWS), for example, between a pair of wireless headphones that can be inserted into both left and right ears of the user and a wireless terminal (for example, a smartphone) carried by the user. Hereinafter, the term "headphone" and the term "earphone" are not technically distinguished from each other, and wireless earphones will be described as an example of the wireless headphones according to the present disclosure. A method of the wireless communication is not limited to Bluetooth (registered trademark), and may be, for example, a wireless local area Network (LAN) such as Wi-Fi (registered trademark).

A system configuration of a wireless communication system 100 according to the first embodiment will be described with reference to FIG. 1. FIG. 1 is a block diagram illustrating a system configuration example of the wireless communication system 100 according to the first embodiment. The wireless communication system 100 includes at least a pair of wireless earphones 10L and 10R and a smartphone 50. The wireless communication system 100 may further include a charging case 30.

The wireless earphones 10L and 10R are inner acoustic devices used by being worn on the user's ears, and include ear pieces EPL and EPR (see FIG. 3) attached to the main bodies of the wireless earphones 10L and 10R, respectively. The wireless earphones 10L and 10R are constituted by a pair of left and right wireless earphones, and are worn on a left ear and a right ear of the user, respectively. For example, the wireless earphones 10L and 10R are held in a state of being inserted into external auditory canals by the ear pieces EPL and EPR with respect to the user's ears, and the state of being held is a use state of the wireless earphones 10L and 10R.

In the pair of wireless earphones 10L and 10R, an internal configuration of the wireless earphone 10L that can be inserted into the user's left ear and an internal configuration of the wireless earphone 10R that can be inserted into the user's right ear are the same. Therefore, in FIG. 1, the same reference numerals are given to the same internal configurations of the wireless earphones 10L and 10R. In principle, the internal configurations of the wireless earphones 10L and 10R can be distinguished from each other on the left and right sides by adding "L" and "R" to ends of the reference numerals to the internal configuration of the wireless earphone 10L and the internal configuration of the wireless earphone 10R, respectively, and a reference relationship of "L" and "R" is not applied to some of the internal configurations. For example, an LED, a RAM, and a ROM are assigned with consecutive reference numerals. Further, in the following description, only one, for example, the left wireless earphone 10L will be described, and the other, for example, the right wireless earphone 10R will be simplified or omitted.

Figure 4:
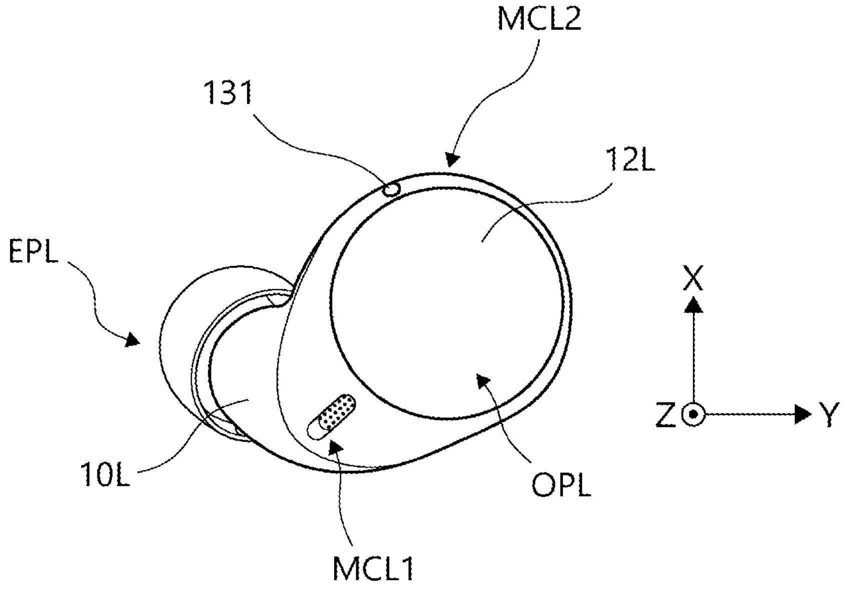
FIG. 4 is an external view of the wireless earphone according to the first embodiment as viewed from a front side on which an operation input unit of the wireless earphone can be seen.
Figure 5:
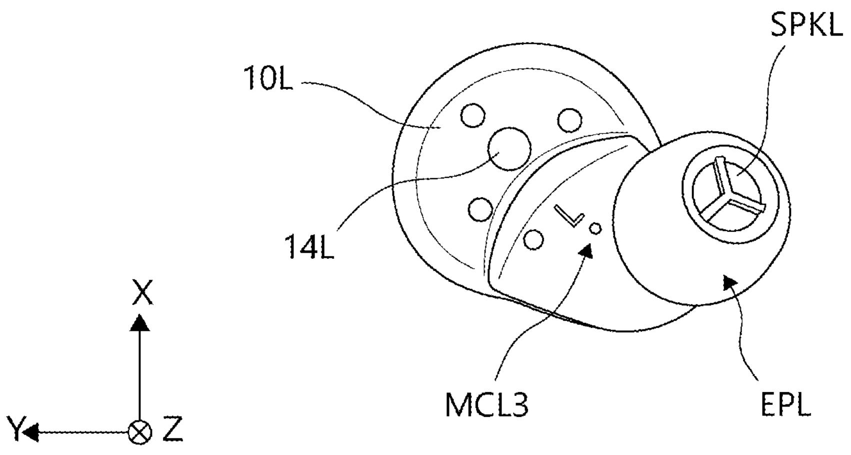
FIG. 5 is an external view of the wireless earphone according to the first embodiment as viewed from a rear side on which the operation input unit thereof cannot be seen.

The wireless earphone 10L includes a housing in which the earpiece EPL is detachably provided on one end side on which a speaker SPKL is disposed (see FIGS. 4 and 5). The wireless earphone 10L includes an earphone control unit 11L, an operation input unit 12L, a light emission diode (LED) 131, a wearing sensor 14L, a random access memory (RAM) 151, a read only memory (ROM) 161, a sound input and output control unit 17L, a charging case storage detection unit 18L, a wireless communication unit 19L, a power monitoring unit 20L including a battery BTL, a charging case communication unit 21L, an utterance microphone MCL1, a feed forward (FF) microphone MCL2, a feedback (FB) microphone MCL3, and the speaker SPKL.

The wireless earphone 10R includes a housing in which the earpiece EPR is detachably provided on one end side on which a speaker SPKR is disposed. The wireless earphone 10R includes an earphone control unit 11R, an operation input unit 12R, an LED 132, a wearing sensor 14R, a RAM 152, a ROM 162, a sound input and output control unit 17R, a charging case storage detection unit 18R, a wireless communication unit 19R, a power monitoring unit 20R including a battery BTR, a charging case communication unit 21R, an utterance microphone MCR1, an FF microphone MCR2, an FB microphone MCR3, and the speaker SPKR.

Next, the internal configuration of wireless earphone 10L will be described with reference to FIGS. 1, 4, and 5. FIG. 4 is an external view of the wireless earphone 10L according to the first embodiment as viewed from a front side on which the operation input unit 12L of the wireless earphone 10L can be seen. FIG. 5 is an external view of the wireless earphone 10L according to the first embodiment as viewed from a rear side on which the operation input unit 12L of the wireless earphone 10L cannot be seen.

The earphone control unit 11L includes, for example, a processor such as a central processing unit (CPU), a micro processing unit (MPU), or a digital signal processor (DSP). The earphone control unit 11L functions as a controller that governs an overall behavior of the wireless earphone 10L, and performs control processing for controlling the overall operation of each of the units of the wireless earphone 10L, data input and output processing, data calculation processing, and data storage processing with each of the units of the wireless earphone 10L. The earphone control unit 11L operates in accordance with programs and data stored in the ROM 161, and uses the RAM 151 when operating to temporarily store data or information created or acquired by the earphone control unit 11L in the RAM 151 or transmit the data or information to the wireless communication unit 19L or the charging case communication unit 21L.

The operation input unit 12L (an example of an input detection unit) is implemented by a device that detects an input operation of the user, and includes, for example, a touch sensor that detects the input operation of the user. As will be described later with reference to FIG. 4, the operation input unit 12L has an operation portion OPL on which the input operation from the user is performed, generates a signal corresponding to detection of the input operation performed on the operation portion OPL, and transmits the signal to the earphone control unit 11L. Examples of the input operation from the user include, but are not limited to, a single press operation of the operation portion OPL, a double press operation of the operation portion OPL (for example, a double continuous press operation of less than 1 second), a triple press operation of the operation portion OPL (for example, a triple continuous press operation of less than 1.5 seconds), a long press operation in which the operation portion OPL is continuously pressed for a predetermined time (for example, 5 seconds) or more, and a flick operation of the operation portion OPL. Further, a time of the continuous double press operation is not limited to less than 1 second, and similarly, a time of the continuous triple press operation is not limited to less than 1.5 seconds.

The LED 131 (an example of a light emitting element) includes one or more LED elements, and performs lighting, blinking, or a combination of the lighting and the blinking in accordance with a pattern corresponding to a control signal from the earphone control unit 11L in a pairing mode to be described later. The LED 131 is disposed at a position on one end side of the housing of the wireless earphone 10L corresponding to an end portion (for example, an upper end portion of the operation portion OPL along a +X direction) on a circumference of the operation portion OPL of the operation input unit 12L provided so as to be exposed to the housing of the wireless earphone 10L (see FIG. 4). By disposing the LED 131 at this position, when the wireless earphone 10L is stored in the charging case 30 (see FIG. 3), the lighting or blinking state of the LED 131 can be recognized clearly by the user directly or indirectly by being reflected by a wall surface in an earphone storage space SPL of the charging case 30. The LED 131 may be omitted from the configuration of the wireless earphone 10L. Further, the LED 131 is not limited to being disposed at the position (for example, the position exposed to be visible to the user when a lid 34 of the charging case 30 is opened) on one end side of the housing of the wireless earphone 10L corresponding to the end portion (for example, the upper end portion of the operation portion OPL along the +X direction) on the circumference of the operation portion OPL, and may be disposed at a position (for example, a position not exposed to be visually recognizable by the user when the lid 34 of the charging case 30 is opened) at which the light from the LED 131 can be reflected by the inner wall (not illustrated) of the earphone storage space SPL. Accordingly, regardless of whether the LED 131 is visible to the user when the lid 34 of the charging case 30 is opened (that is, whether the LED 131 is exposed), the user can easily recognize the pattern of lighting or blinking because the light of the LED 131 is directly lighted or blinked, or indirectly reflected.

The LED 132 (an example of the light emitting element) includes one or more LED elements, and performs lighting, blinking, or a combination of the lighting and the blinking in accordance with a pattern corresponding to a control signal from the earphone control unit 11R in the pairing mode to be described later. Similarly to the LED 131, the LED 132 is disposed at a position on one end side of a housing of the wireless earphone 10R corresponding to an end portion (for example, an upper end portion of the operation portion OPL along the +X direction) on the circumference of the operation portion OPL of the operation input unit 12R provided so as to be exposed to the housing of the wireless earphone 10R. By disposing the LED 132 at this position, when the wireless earphone 10R is stored in the charging case 30 (see FIG. 3), the lighting or blinking state of the LED 132 can be recognized clearly by the user directly or indirectly by being reflected by a wall surface in an earphone storage space SPR of the charging case 30. The LED 132 may be omitted from the configuration of the wireless earphone 10R.

The wearing sensor 14L is implemented by a device that detects whether the wireless earphone 10L is worn on the user's ear (the left ear in the case of the wearing sensor 14L), and includes, for example, an infrared sensor or an electrostatic sensor. In a case of the infrared sensor, the wearing sensor 14L can detect that the wireless earphone 10L is worn on the user's left ear by receiving infrared rays emitted from the wearing sensor 14L and reflected in the left ear if the wireless earphone 10L is worn on the user's left ear. Further, the wearing sensor 14L can detect that the wireless earphone 10L is not worn on the user's left ear by not receiving the infrared rays because the infrared rays emitted from the wearing sensor 14L are not reflected if the wireless earphone 10L is not worn on the user's left ear. In a case of the electrostatic sensor, the wearing sensor 14L can detect that the wireless earphone 10L is worn on the user's left ear by determining that a change value of an electrostatic capacitance according to a distance to an inside of the user's left ear is larger than a threshold at which the wearing sensor 14L is hold if the wireless earphone 10L is worn on the user's left ear. Further, the wearing sensor 14L can detect that the wireless earphone 10L is not worn on the user's left ear by determining that the change value of the electrostatic capacitance value is smaller than the threshold at which the wearing sensor 14L is hold if the wireless earphone 10L is not worn on the user's left ear. The wearing sensor 14L is provided at a position facing the external auditory canal in a state that the wireless earphone 10L is inserted into the user's left ear, and provided on a back side of the operation portion OPL (see FIG. 5).

The RAM 151 is a work memory used when each of processing of the earphone control unit 11L is executed, and temporarily stores the data or the information generated or acquired by the earphone control unit 11L.

The RAM 152 is a work memory used when each of processing of the earphone control unit 11R is executed, and temporarily stores data or information generated or acquired by the earphone control unit 11R.

The ROM 161 stores a program that defines each of processing of the earphone control unit 11L and data when the program is executed.

The ROM 162 stores a program that defines each of processing of the earphone control unit 11R and data when the program is executed.

The sound input and output control unit 17L is connected to each of the utterance microphone MCL1, the FF microphone MCL2, the FB microphone MCL3, and the speaker SPKL so as to be able to input and output a data signal (for example, a sound signal), and includes a communication circuit capable of executing various processing related to the input and output of the sound signal. The sound input and output control unit 17L converts a digital sound signal transmitted from the earphone control unit 11L into an analog sound signal and outputs the analog sound signal from the speaker SPKL. The sound input and output control unit 17L receives audio signals (including the sound signal) collected by each of the utterance microphone MCL1, the FF microphone MCL2, and the FB microphone MCL3, converts the analog audio signals into digital audio signals, and transmits the digital sound signals to the earphone control unit 11L.

FIGS. 4 and 5 illustrate, for example, the wireless earphone 10L of the pair of wireless earphones 10L and 10R, and the description of FIGS. 4 and 5 can be similarly applied to the wireless earphone 10R. In the description of FIGS. 4 and 5, three-dimensional coordinates (XYZ coordinates) are provided for convenience, an XY plane is provided so as to be parallel to the operation portion OPL of the operation input unit 12L of FIG. 4, and a Z axis is provided perpendicular to the XY plane.

The utterance microphone MCL1 is implemented by a microphone device capable of collecting (that is, detecting the sound signal) a sound generated based on utterance of the user. The utterance microphone MCL1 collects the sound generated based on the utterance of the user, converts the sound into an electric signal, and transmits the electric signal to the sound input and output control unit 17L. The utterance microphone MCL1 is disposed such that an extending direction of wireless earphone 10L faces a mouth of the user in a state that the wireless earphone 10L is inserted into the user's left ear (see FIG. 4), and is disposed at a position below the operation portion OPL (that is, in a-X direction). The sound uttered by the user is collected by the utterance microphone MCL1 and converted into the electric signal, and the utterance microphone MCL1 can detect whether the user is uttered based on an amplitude of the electric signal.

The FF microphone MCL2 is implemented by a microphone device capable of collecting (detecting) an ambient sound outside the wireless earphone 10L as the audio signal. The FF microphone MCL2 converts the outside ambient sound into the electric signal (audio signal) and transmits the electric signal to the sound input and output control unit 17L. The FF microphone MCL2 is disposed at a position that is farther from the mouth of the user than the utterance microphone MCL1 in a state that the wireless earphone 10L is inserted into the user's left ear, and is in the vicinity of LED 131 and above the operation portion OPL (that is, in the +X direction) (see FIG. 4).

The FB microphone MCL3 is disposed as close as possible to the external auditory canal of the user's left ear, and is implemented by the microphone device capable of collecting (detecting) a sound in the vicinity of the external auditory canal. The FB microphone MCL3 converts a part of the sound in the vicinity of the external auditory canal (for example, the sound output from the speaker SPKL) into the electric signal (audio signal) and transmits the electric signal to the sound input and output control unit 17L. The FB microphone MCL3 is disposed at a position facing the external auditory canal in a state that the wireless earphone 10L is inserted into the user's left ear (see FIG. 5).

The speaker SPKL acoustically outputs the audio signal transmitted from the sound input and output control unit 17L based on an instruction from the earphone control unit 11L. The speaker SPKL acoustically outputs, for example, a prescribed sound signal in which a sound message indicating that the wireless earphone 10L shifts to the pairing mode (refer to the following description) is recorded. As illustrated in FIGS. 4 and 5, the earpiece EPL is provided so as to surround the speaker SPKL.

The charging case storage detection unit 18L is configured by a device that detects whether the housing of the wireless earphone 10L is stored in the charging case 30 (specifically, in the earphone storage space SPL provided in the charging case 30), and includes, for example, a magnetic sensor. The charging case storage detection unit 18L detects that the housing of the wireless earphone 10L is stored in the charging case 30, for example, by determining that a detected magnetic force is larger than a threshold of the wireless earphone 10L. On the other hand, the charging case storage detection unit 18L detects that the housing of the wireless earphone 10L is not stored in the charging case 30, for example, by determining that the detected magnetic force is smaller than the threshold of the wireless earphone 10L. The charging case storage detection unit 18L transmits a detection result of whether the housing of the wireless earphone 10L is stored in the charging case 30 to the earphone control unit 11L. The charging case storage detection unit 18L may be configured using a sensor device (for example, an infrared sensor) other than the magnetic sensor.

The wireless communication unit 19L includes an antenna ATL and a communication circuit that performs wireless communication with the smartphone 50. The wireless communication unit 19L receives the data signal transmitted from the smartphone 50 or the wireless earphone 10R via the antenna ATL, and transmits the data signal transmitted from the earphone control unit 11L to the smartphone 50 or the wireless earphone 10R via the antenna ATL.

The power monitoring unit 20L includes the battery BTL and a circuit for monitoring remaining electric power of the battery BTL. While the housing of the wireless earphone 10L is stored in the charging case 30 (specifically, in the earphone storage space SPL provided in the charging case 30), the power monitoring unit 20L can receive power for charging the battery BTL transmitted from the charging case 30, monitors the remaining electric power of the battery BTL based on the received power, and transmits a monitoring result to the earphone control unit 11L.

The charging case communication unit 21L includes a communication circuit that performs data signal communication with the charging case 30 while the housing of the wireless earphone 10L is stored in the charging case 30 (specifically, in the earphone storage space SPL provided in the charging case 30). The charging case communication unit 21L performs the data signal communication (transmission and reception) with a charging case control unit 31 of the charging case 30 while the housing of the wireless earphone 10L is stored in the charging case 30 (specifically, in the earphone storage space SPL provided in the charging case 30).

Figure 3:
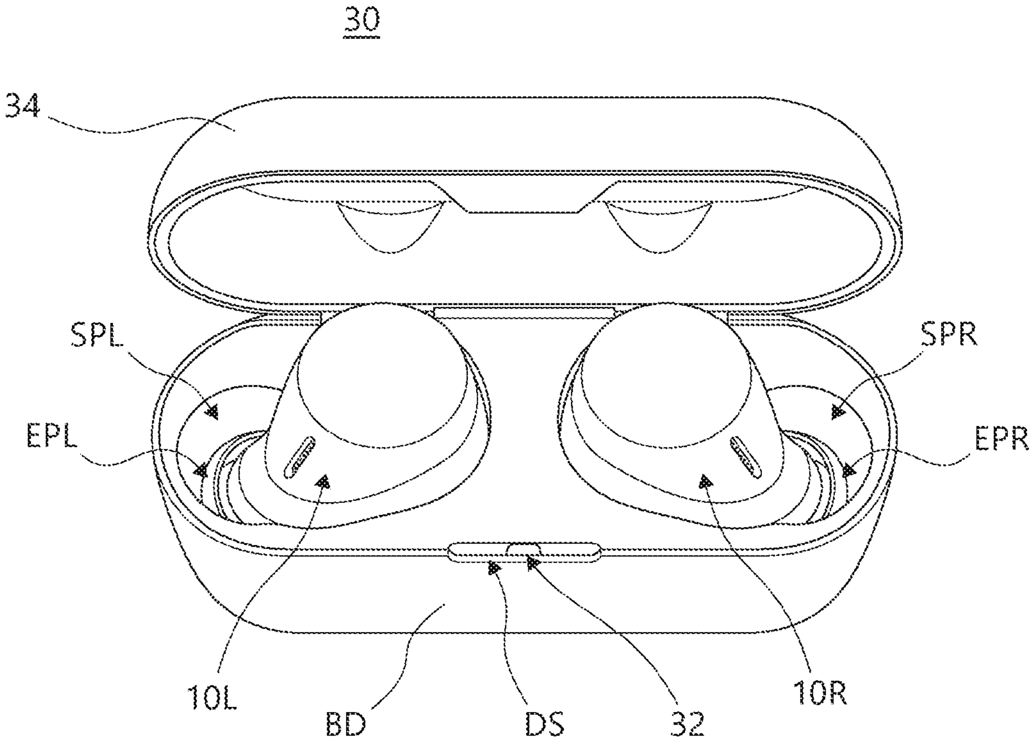
FIG. 3 is a diagram illustrating an example of a state in which wireless earphones according to the first embodiment are stored in a charging case.

The charging case 30 includes a main body housing portion BD having the earphone storage spaces SPL and SPR capable of storing the wireless earphones 10L and 10R, respectively, and the lid 34 capable of being opened and closed with respect to the main body housing portion BD via a hinge or the like (see FIG. 3). The charging case 30 includes the charging case control unit 31, a charging case LED 32, a lid sensor 33, the lid 34, a charging case power monitoring unit 35 including a battery BT1, and magnets MGL and MGR.

Next, an internal configuration of the charging case 30 will be described with reference to FIGS. 1 and 3. FIG. 3 is a diagram illustrating an example of a state in which the wireless earphones according to the first embodiment are stored in the charging case.

The charging case control unit 31 includes, for example, a processor such as a CPU, an MPU, or a field programmable gate array (FPGA). The charging case control unit 31 functions as a controller that governs overall behavior of the charging case 30, and performs control processing for controlling the overall operation of each of the units of the charging case 30, data input and output processing from and to each of the units of the charging case 30, data calculation processing, and data storage processing. The charging case control unit 31 operates in accordance with a program and data stored in an ROM (not illustrated) included in the charging case 30, or temporarily stores data or information created or acquired by the charging case control unit 31 in a RAM (not illustrated) or transmits the data or the information to the wireless earphones 10L and 10R by using a RAM (not illustrated) included in the charging case 30 at the time of operation.

The charging case LED 32 includes at least one LED element, and performs, in response to a control signal from the charging case control unit 31 lighting, blinking, or a combination of the lighting and the blinking in accordance with a pattern corresponding to the control signal. The charging case LED 32 lights up in a predetermined color (for example, green) while both of the wireless earphones 10L and 10R are stored and being charged. As illustrated in FIG. 3, the charging case LED 32 is disposed, for example, at a center portion of a bottom surface of a recessed step portion DS provided on one end side of a center portion of an upper end of the main body housing portion BD of the charging case 30. By disposing the charging case LED 32 at this position, the user can intuitively and easily recognize that both of the wireless earphones 10L and 10R are being charged in the charging case 30.

The lid sensor 33 is implemented by a device capable of detecting whether the lid 34 is opened and closed with respect to the main body housing portion BD of the charging case 30, and includes, for example, a pressure sensor capable of detecting the opening and closing of the lid 34 based on pressure when the lid 34 is closed. The lid sensor 33 is not limited to the pressure sensor described above, and may be configured using a magnetic sensor capable of detecting the opening and closing of the lid 34 based on a magnetic force when the cover 34 is closed. When the lid sensor 33 detects that the lid 34 is closed (that is, not opened) or not closed (that is, opened), the lid sensor 33 transmits a signal indicating a detection result to the charging case control unit 31.

The lid 34 is provided to prevent exposure of the main body housing portion BD of the charging case 30 capable of storing the wireless earphones 10L and 10R.

The charging case power monitoring unit 35 includes the battery BT1 and a circuit for monitoring the remaining electric power of the battery BT1. The charging case power monitoring unit 35 charges the battery BT1 of the charging case 30 by receiving supply of power from an external power supply EXPW, monitors the remaining electric power of the battery BT1 periodically or constantly, and transmits a monitoring result to the charging case control unit 31.

The magnet MGL is provided to determine whether the housing of the wireless earphone 10L is stored in the earphone storage space SPL of the charging case 30, and is disposed in the vicinity of the earphone storage space SPL.

The magnet MGR is provided to determine whether the housing of the wireless earphone 10R is stored in the earphone storage space SPR of the charging case 30, and is disposed in the vicinity of the earphone storage space SPR.

The earphone storage space SPL has a space in which the housing of the wireless earphone 10L can be stored in the main body housing portion BD of the charging case 30.

The earphone storage space SPR has a space in which the housing of the wireless earphone 10R can be stored in the main body housing portion BD of the charging case 30.

The smartphone 50 transmits and receives the data signal to and from each of wireless earphones 10L and 10R in accordance with the predetermined wireless communication method (for example, Bluetooth (registered trademark)). The smartphone 50 is carried (hold) by the user who is the wearer of the wireless earphones 10L and 10R. The smartphone 50 is an example of a wireless terminal that performs the wireless communication such as Bluetooth (registered trademark) with each of wireless earphones 10L and 10R, and may be a mobile phone or a wireless terminal that does not have a telephone function.

Figure 2:
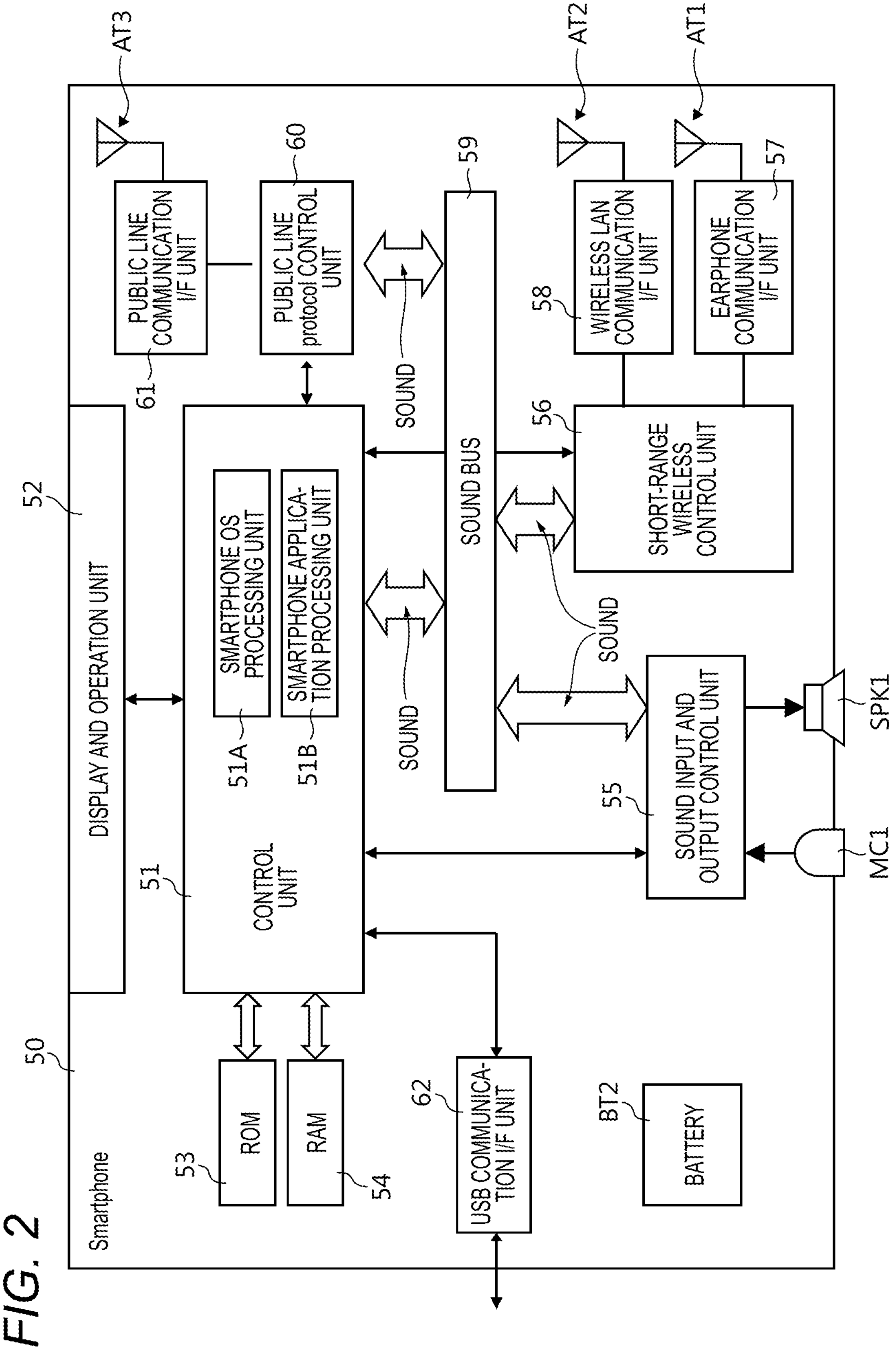
FIG. 2 is a block diagram illustrating a hardware configuration example of a smartphone according to the first embodiment.

Next, an internal configuration of the smartphone 50 that performs the wireless communication with each of the wireless earphones 10L and 10R will be described with reference to FIG. 2. FIG. 2 is a block diagram illustrating a hardware configuration example of the smartphone according to the first embodiment.

The smartphone 50 includes a control unit 51, a display and operation unit 52, a ROM 53, a RAM 54, a sound input and output control unit 55, a microphone MC1, a speaker SPK1, a short-range wireless control unit 56, an earphone communication I/F unit 57, a wireless LAN communication I/F unit 58, a sound bus 59, a public line protocol control unit 60, a public line communication I/F unit 61, a universal serial bus (USB) communication I/F unit 62, and a battery BT2. In FIG. 2, an interface is abbreviated as "I/F".

The control unit 51 includes, for example, a CPU, a DSP, or an FPGA. The control unit 51 functionally includes a smartphone operating System (OS) processing unit 51A and a smartphone application processing unit 51B, and performs various processing and controls by cooperation of each of the smartphone OS processing unit 51A and the smartphone application processing unit 51B with each of the ROM 53 and the RAM 54.

The smartphone OS processing unit 51A executes processing and control related to basic operations related to various processing performed by the smartphone 50.

The smartphone application processing unit 51B executes processing of various applications including an application suitable for the smartphone 50 that can be executed with each of the wireless earphones 10L and 10R.

The display and operation unit 52 includes a touch panel that receives the input operation of the user and displays data generated by the control unit 51, and forms a so-called user interface. For example, when the wireless earphones 10L and 10R are shifted to the pairing mode, the display and operation unit 52 may display, based on a notification from each of the wireless earphones 10L and 10R, a message indicating that the wireless earphones 10L and 10R are shifted to the pairing mode in a pop-up manner under the control of the control unit 51.

The ROM 53 stores a program that defines each of the processing of the control unit 51 and data when the program is executed.

The RAM 54 is a work memory used when each of the processing of the control unit 51 is executed, and temporarily stores the data generated or acquired by the control unit 51.

The sound input and output control unit 55 is connected to each of the microphone MC1 and the speaker SPK1 so as to be able to input and output the data signal (for example, a sound signal), and includes a communication circuit capable of executing various processing related to the input and output of the sound signal. The sound input and output control unit 55 converts a digital sound signal transmitted from the control unit 51 via the sound bus 59 into an analog sound signal and outputs the analog sound signal from the speaker SPK1. Further, the sound input and output control unit 55 receives an analog audio signal (including a sound signal) collected by the microphone MC1, converts the analog audio signal into a digital audio signal, and transmits the digital audio signal to the control unit 51.

The microphone MC1 is implemented by a microphone device capable of collecting (that is, detecting the sound signal) the sound generated based on the utterance of the user. The microphone MC1 converts the collected sound into the electric signal and transmits the electric signal to the sound input and output control unit 55.

The speaker SPK1 acoustically outputs the audio signal transmitted from the sound input and output control unit 55 via the control unit 51 and the sound bus 59 based on an instruction from the control unit 51. The speaker SPK1 acoustically outputs, for example, a music signal played by the smartphone application processing unit 51B when the music signal is not output from each of the wireless earphones 10L and 10R.

The short-range wireless control unit 56 includes a circuit capable of performing control for wirelessly communicating the input audio signal such as the sound signal, and is connected to each of the earphone communication I/F unit 57 and the wireless LAN communication I/F unit 58 such that the data signal can be input and output. The short-range wireless control unit 56 receives the audio signal transmitted from at least one of the earphone communication I/F unit 57 and the wireless LAN communication I/F unit 58, and transmits the audio signal to the control unit 51 via the sound bus 59. The short-range wireless control unit 56 transmits the audio signal such as the sound signal input via the sound bus 59 to at least one of the earphone communication I/F unit 57 and the wireless LAN communication I/F unit 58.

The earphone communication I/F unit 57 includes an antenna AT1 and a communication circuit that performs the wireless communication (for example, Bluetooth (registered trademark)) with each of the wireless earphones 10L and 10R. The earphone communication I/F unit 57 receives, via the antenna AT1, the data signal transmitted from each of the wireless earphones 10L and 10R, and transmits, via the antenna AT1, the data signal transmitted from the short-range wireless control unit 56 to each of the wireless earphones 10L and 10R.

The wireless LAN communication I/F unit 58 includes an antenna AT2 and a communication circuit connectable to the Internet via a wireless LAN router (not illustrated). Further, the wireless LAN communication I/F unit 58 may perform the wireless communication (for example, a wireless LAN such as Wi-Fi (registered trademark)) with each of the wireless earphones 10L and 10R via the above-described wireless LAN router (not illustrated). The wireless LAN communication I/F unit 58 receives, via the antenna AT2, the data signal transmitted from each of the wireless earphones 10L and 10R, and transmits, via the antenna AT2, the data signal transmitted from the short-range wireless control unit 56 to each of the wireless earphones 10L and 10R.

The sound bus 59 is a data transmission path of the audio signal such as the sound signal, and transmits the sound signal between the control unit 51 and the sound input and output control unit 55, between the control unit 51 and the short-range wireless control unit 56, and between the public line protocol control unit 60 and the control unit 51, the sound input and output control unit 55, or the short-range wireless control unit 56.

The public line protocol control unit 60 includes a circuit capable of executing control for wirelessly communicating the input audio signal such as the sound signal, and is connected to the public line communication I/F unit 61 so as to be able to input and output the data signal. The public line protocol control unit 60 receives the audio signal transmitted from the public line communication I/F unit 61 and transmits the audio signal to the control unit 51 via the sound bus 59 or directly. The public line protocol control unit 60 transmits the audio signal such as the sound signal input via the sound bus 59 to the public line communication I/F unit 61.

The public line communication I/F unit 61 includes an antenna AT3 and a communication circuit that performs the wireless communication (for example, wireless communication based on a fourth generation mobile communication system (4G) such as long term evolution (LTE) or fifth generation mobile communication system (5G)) with another external terminal (not illustrated). The public line communication I/F unit 61 receives the data signal transmitted from another external terminal (not illustrated) via the antenna AT3, and transmits the data signal transmitted from the public line protocol control unit 60 to another external terminal (not illustrated) via the antenna AT3.

The USB communication I/F unit 62 includes a communication circuit that inputs and outputs the data signal to and from an external device (not illustrated) that can be connected via a USB cable (not illustrated). The USB communication I/F unit 62 transmits the data signal to the above-described external device (not illustrated), and receives the data signal transmitted from the external device (not illustrated) and transmits the data signal to the control unit 51.

The battery BT2 includes a secondary battery capable of storing electric power supplied from an external commercial power supply (not illustrated), and supplies necessary power to each of the units configuring the smartphone 50.

Figure 6:
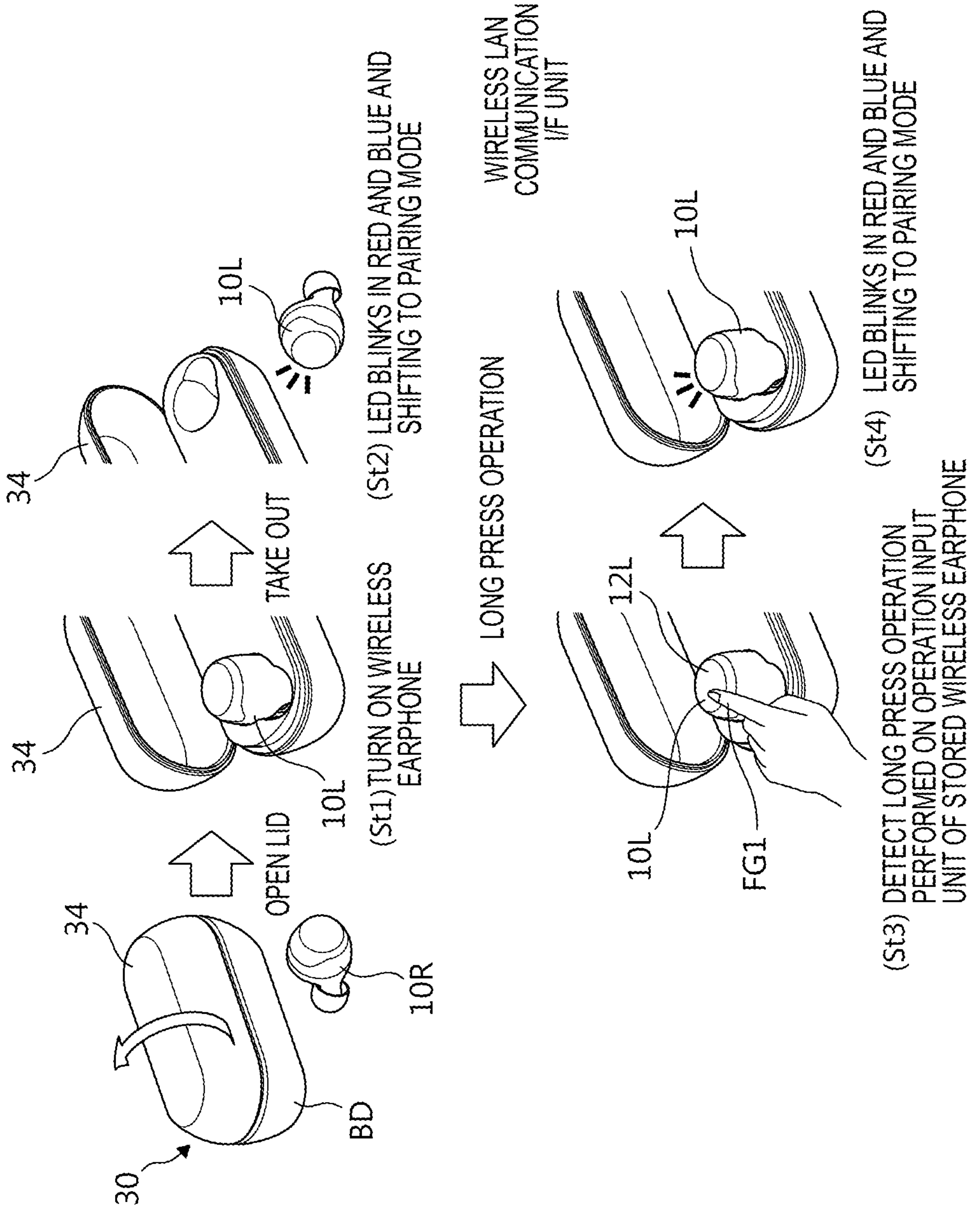
FIG. 6 is an operation transition diagram illustrating an example of a first use case of a transition to a pairing mode.
Figure 7:
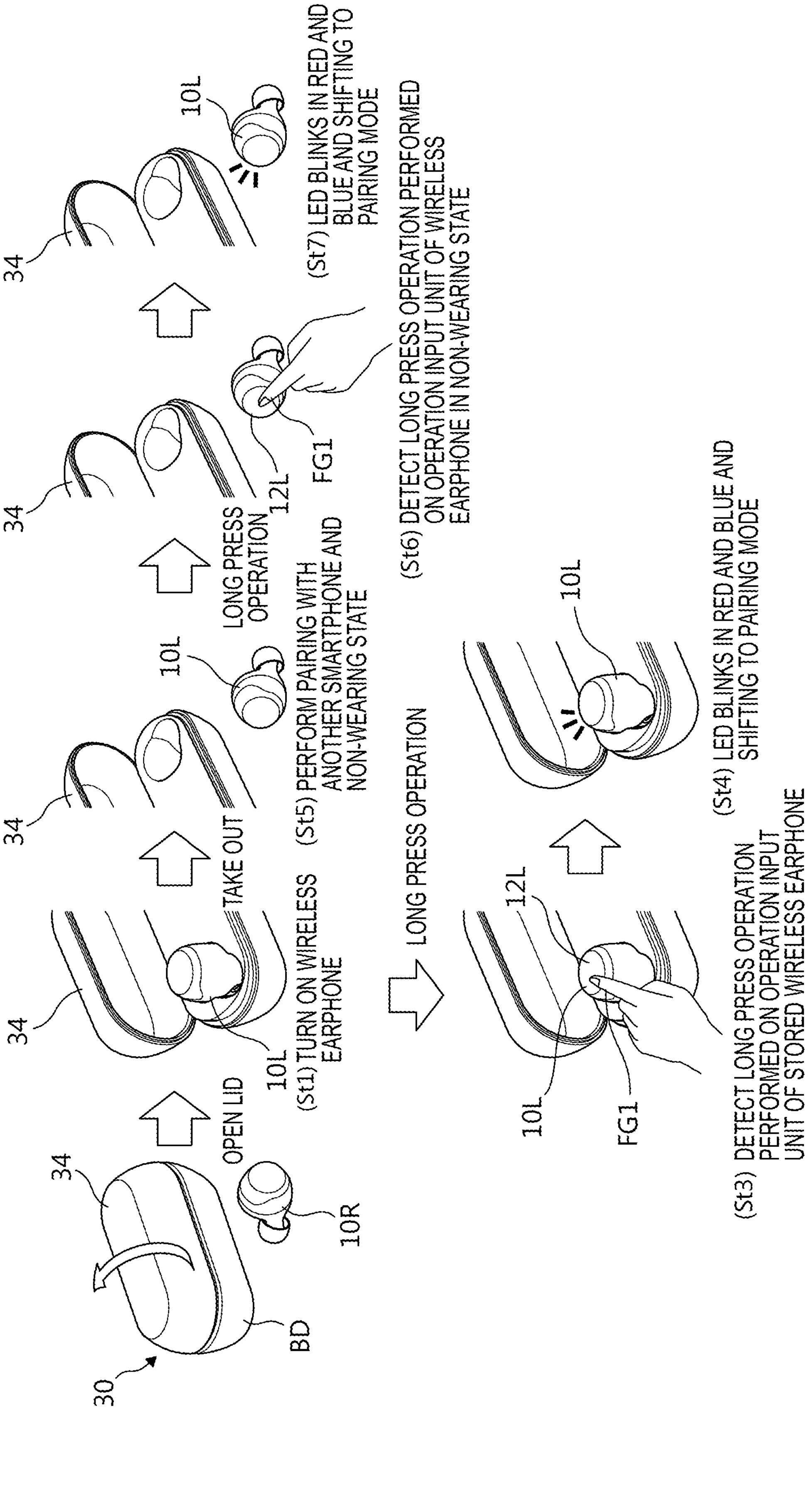
FIG. 7 is an operation transition diagram illustrating an example of a second use case of the transition to the pairing mode.
Figure 8:
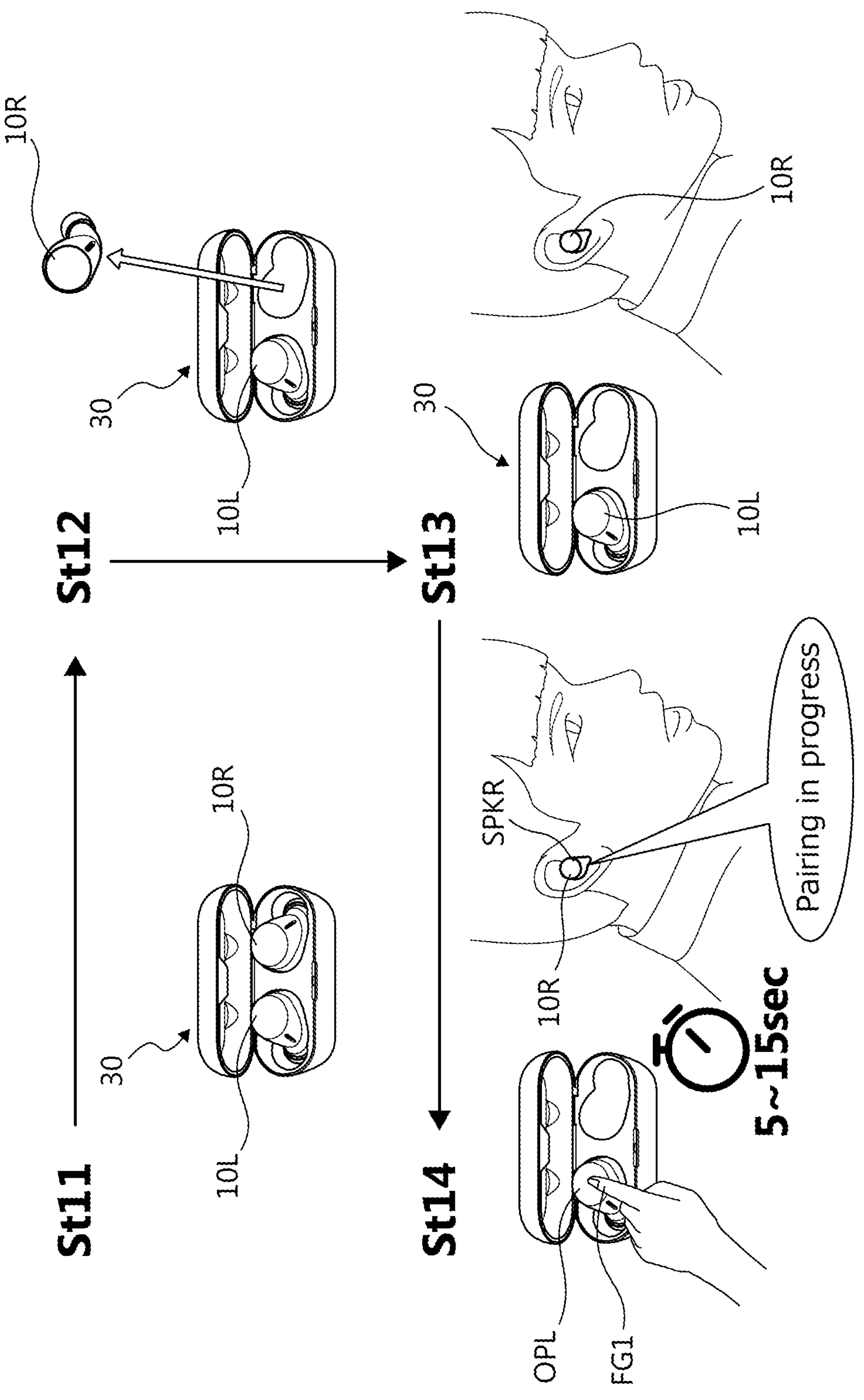
FIG. 8 is an operation transition diagram illustrating an example of a third use case of the transition to the pairing mode.

Next, an operation example of Bluetooth (registered trademark) pairing performed between the wireless earphones 10L and 10R and the smartphone 50 in the wireless communication system 100 according to the first embodiment will be described with reference to FIGS. 6 to 8. FIG. 6 is an operation transition diagram illustrating an example of a first use case of a transition to the pairing mode. FIG. 7 is an operation transition diagram illustrating an example of a second use case of the transition to the pairing mode. FIG. 8 is an operation transition diagram illustrating an example of a third use case of the transition to the pairing mode.

In the example of the first use case illustrated in FIG. 6, a state immediately after the user carrying the smartphone 50 purchases the wireless earphones 10L and 10R to be wirelessly connected by Bluetooth (registered trademark) is assumed. As illustrated in Step St1 of FIG. 6, one (for example, the wireless earphone 10R) of the wireless earphones 10L and 10R is taken out from the charging case 30, and the other (for example, the wireless earphone 10L) is stored in the earphone storage space SPL of the charging case 30. It is assumed that the wireless earphone 10R is in a state of being turned on. In the following description of FIG. 6, in order to simplify the description, the use case in which the user performs an operation on the wireless earphone 10L to shift the wireless earphones 10L and 10R to the pairing mode will be described as an example, and the same applies to a case in which the wireless earphone 10L and the wireless earphone 10R are switched and the user performs the operation on the wireless earphone 10R to shift the wireless earphones 10L and 10R to the pairing mode.

When the user opens the lid 34 with respect to the main body housing portion BD of the charging case 30, the charging case control unit 31 of the charging case 30 receives a signal indicating a detection result indicating that the lid 34 is opened from the lid sensor 33, and transmits the signal to the wireless earphone 10L. The earphone control unit 11L of the wireless earphone 10L turns on the power supply based on the signal input from the charging case 30 (St1). A method of turning on the power supply of the wireless earphone 10L is not limited to the signal input from the charging case 30.

Here, when the user takes out the wireless earphone 10L from the charging case 30, the earphone control unit 11L of the wireless earphone 10L causes the LED 131 to emit light in accordance with a predetermined pattern (for example, a pattern in which a red light and a blue light alternately blink) at a time point when a predetermined time elapses after the wireless earphone 10L is taken out from the charging case 30 regardless of whether the wireless earphone 10L is inserted (worn) into the user's ear, and shifts (transitions) an operation mode of the wireless earphones 10L and 10R to the pairing mode for performing the pairing (that is, wireless connection processing for performing the wireless communication of Bluetooth (registered trademark)) with the smartphone 50 (St2). The predetermined pattern described above is not limited to the pattern in which the red light and the blue light alternately blink, and may be, for example, a pattern in which only the red light or only the blue light blinks, as long as the user can recognize that the pairing mode is shifted. Accordingly, the wireless earphone 10L can be easily shifted to the pairing mode only by being taken out from the charging case 30 by the user. Further, the user can easily recognize that the wireless earphone 10L is in the pairing mode by the light emission of the LED 131.

On the other hand, it is assumed that, from the state of step St1, a long press operation (for example, an operation in which the user is in contact with the operation portion OPL for 5 seconds or more with a finger FG1) is performed, by the user with the finger FG1, on the operation portion OPL of the operation input unit 12L of the wireless earphone 10L in a state (in other words, a non-wearing state in which the wireless earphone 10L is not worn by the user) of being stored in the earphone storage space SPL of the charging case 30. In this case, the earphone control unit 11L of the wireless earphone 10L detects the above-described long press operation using the operation input unit 12L (St3).

The earphone control unit 11L of the wireless earphone 10L turns on short-range wireless communication (for example, Bluetooth (registered trademark)) via the wireless communication unit 19L based on the detection (an example of detection of the non-wearing state) of the long press operation on the operation portion OPL of the operation input unit 12L performed by the user, and establishes and starts the wireless communication by Bluetooth (registered trademark) with the wireless earphone 10R already taken out from the charging case 30. Further, the earphone control unit 11L of the wireless earphone 10L causes the LED 131 to emit the light in accordance with the predetermined pattern (for example, the pattern in which the red light and the blue light alternately blink), and shifts (transitions) the operation mode of the wireless earphones 10L and 10R to the pairing mode for performing the pairing (that is, the wireless connection processing for performing the wireless communication of Bluetooth (registered trademark)) with the smartphone 50 (St4). Accordingly, even when the wireless earphone 10L is stored in the charging case 30, the wireless earphone 10L can easily shift to the pairing mode by a simple operation such as the long press operation on the operation portion OPL of the operation input unit 12L by the user. Further, the user can easily recognize that the wireless earphone 10L is in the pairing mode by the light emission of the LED 131.

In the example of the second use case illustrated in FIG. 7, it is assumed that, among the wireless earphones 10L and 10R that have been paired with another smartphone (not illustrated) different from the smartphone 50, the wireless earphone 10R is taken out from the charging case 30, the wireless earphone 10L is stored in the charging case 30, and the user carrying the smartphone 50 changes a pairing partner of the wireless earphone 10L to the smartphone 50. Similarly to FIG. 6, it is assumed that the wireless earphone 10R is in a state of being turned on. In the following description of FIG. 7, in order to simplify the description, the use case in which the user performs an operation on the wireless earphone 10L to shift the wireless earphones 10L and 10R to the pairing mode will be described as an example, and the same applies to the case in which the wireless earphone 10L and the wireless earphone 10R are switched and the user performs the operation on the wireless earphone 10R to shift the wireless earphones 10L and 10R to the pairing mode.

When the user opens the lid 34 with respect to the main body housing portion BD of the charging case 30, the charging case control unit 31 of the charging case 30 receives a signal indicating a detection result indicating that the lid 34 is opened from the lid sensor 33, and transmits the signal to the wireless earphone 10L. The earphone control unit 11L of the wireless earphone 10L turns on the power supply based on the signal input from the charging case 30 (St1). A method of turning on the power supply of the wireless earphone 10L is not limited to the signal input from the charging case 30.

Here, when the user takes out the wireless earphone 10L from the charging case 30, the wearing sensor 14L detects the non-wearing state in which the wireless earphone 10L is not inserted (worn) into the user's ear, and the earphone control unit 11L of the wireless earphone 10L performs the pairing again with another smartphone (specifically, another smartphone different from the smartphone 50 (refer to the above description)) paired at a time of previous activation (St5). In the state of step St5, it is assumed that the non-wearing state of the wireless earphone 10L is detected and that the earphone control unit 11L of the wireless earphone 10L detects that the user performs the long press operation on the operation portion OPL of the operation input unit 12L of the wireless earphone 10L (St6). In this case, the earphone control unit 11L of the wireless earphone 10L causes the LED 131 to emit the light in accordance with the predetermined pattern (for example, the pattern in which the red light and the blue light alternately blink), and performs the pairing such that a partner terminal of the pairing is switched from another smartphone (not illustrated, refer to the above description) which is currently being paired to the smartphone 50 in the operation mode of the wireless earphones 10L and 10R (St7). The predetermined pattern described above is not limited to the pattern in which the red light and the blue light alternately blink, and may be, for example, a pattern in which only the red light or only the blue light blinks, as long as the user can recognize that the pairing mode is shifted. Accordingly, even during the pairing with another smartphone (not illustrated, refer to the above description) at present, by detecting that the wireless earphone 10L is taken out from the charging case 30 by the user and that the long press operation is performed on the operation portion OPL of the operation input unit 12L under the non-wearing state of the wireless earphone 10L, it is easily perform to switch the partner terminal of the pairing from another smartphone to the smartphone 50. Further, the user can easily recognize that the wireless earphone 10L is in the pairing mode by the light emission of the LED 131. Since processing contents of steps St3 and St4 are the same in FIGS. 6 and 7, the description of the contents of steps St3 and St4 in FIG. 7 will be omitted in order to avoid redundant description.

In the example of the third use case illustrated in FIG. 8, a state immediately after or not immediately after the user carrying the smartphone 50 purchases the wireless earphones 10L and 10R to be wirelessly connected by Bluetooth (registered trademark) is assumed. As illustrated in step St11 of FIG. 8, the wireless earphones 10L and 10R are both stored in the earphone storage spaces SPL and SPR of the charging case 30. Since the lid 34 is opened by the user, the power supply of the wireless earphones 10L and 10R is turned on based on the signal input from the charging case 30 (St11). In the following description of FIG. 8, in order to simplify the description, the use case in which the user performs an operation on the wireless earphone 10L to shift the wireless earphones 10L and 10R to the pairing mode will be described as an example, and the same applies to a case in which the wireless earphone 10L and the wireless earphone 10R are switched and the user performs the operation on the wireless earphone 10R to shift the wireless earphones 10L and 10R to the pairing mode.

It is assumed that the user takes out the wireless earphone 10R from the charging case 30 (St12) and wears the wireless earphone 10R on the right ear (St13). In step St13, it is illustrated that the user wears the wireless earphone 10R on the right ear, but it is not essential to wear the wireless earphone 10R and it is sufficient that the wireless earphone 10R is taken out from the charging case 30. That is, step St13 is optional processing and may be omitted.

Here, it is assumed that the long press operation (for example, the long press operation of about 5 to 15 seconds) is performed on the operation portion OPL of the wireless earphone 10L stored in the charging case 30 by the finger FG1 of the user, and the earphone control unit 11L of the wireless earphone 10L detects the long press operation via the operation input unit 12L. Based on the detection of the long press operation, the earphone control unit 11L of the wireless earphone 10L turns on the short-range wireless communication (for example, Bluetooth (registered trademark)) via the wireless communication unit 19L, and establishes and starts the wireless communication by Bluetooth (registered trademark) with the wireless earphone 10R already worn on the user's right ear. Then, the earphone control units 11L and 11R of the wireless earphones 10L and 10R shift the operation mode of the wireless earphones 10L and 10R to the pairing mode for pairing with the smartphone 50 (St14). Then, the earphone control unit 11R of the wireless earphone 10R already worn on the user's right ear outputs a sound (for example, "Pairing in progress") indicating that the pairing is being performed from the speaker SPKR in order to allow the user to grasp that the pairing mode is shifted. Accordingly, the user can easily understand that the wireless earphone 10L is being paired currently with the simple operation performed by the user, and thus an erroneous operation by the user can be reduced.

Figure 9:
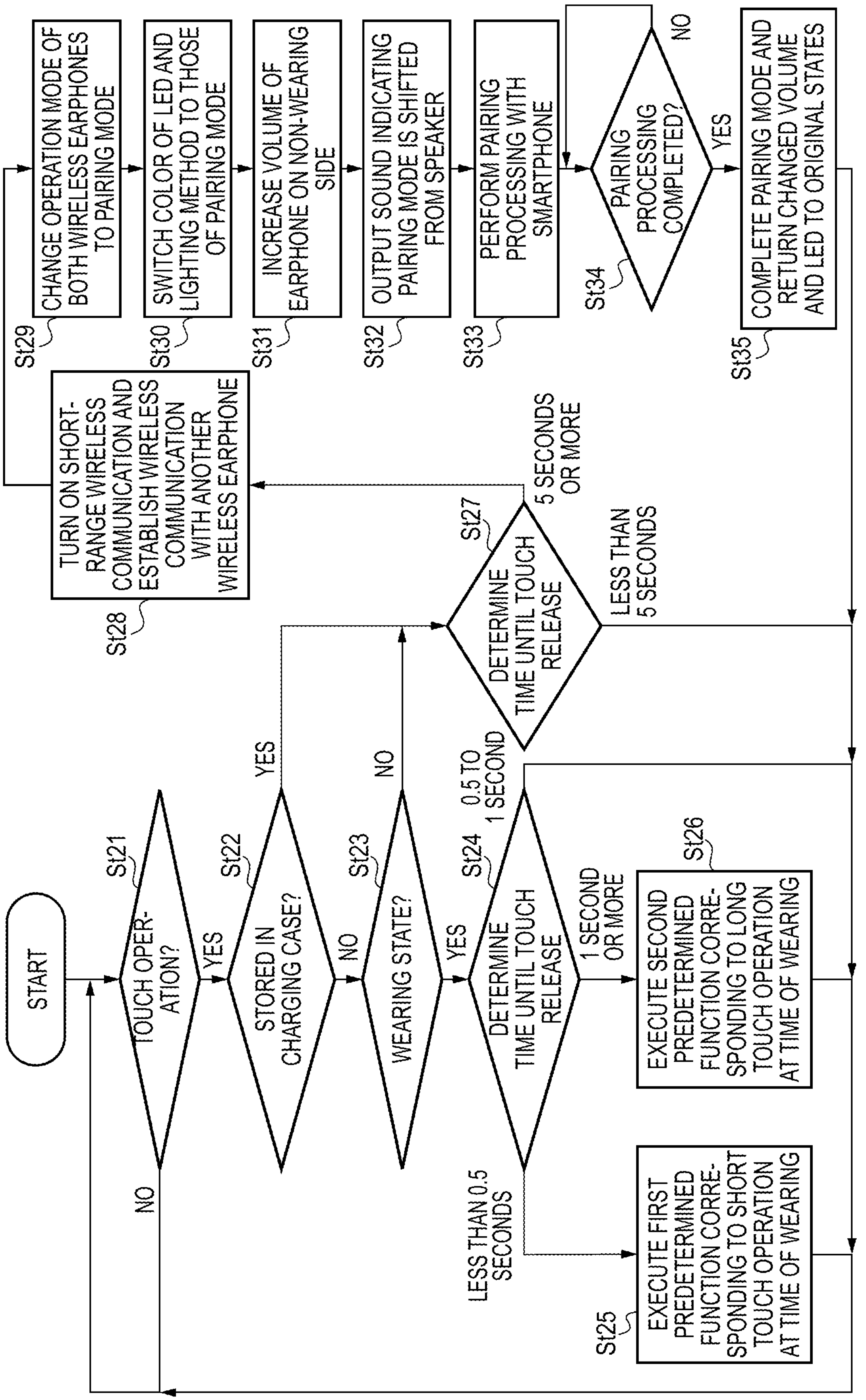
FIG. 9 is a flowchart of an operation procedure example of the wireless earphones according to the first embodiment.

Next, an operation procedure example of the wireless earphones 10L and 10R according to the first embodiment will be described with reference to FIG. 9. FIG. 9 is a flowchart of the operation procedure example of the wireless earphones 10L and 10R according to the first embodiment. In a flowchart of FIG. 9, it is assumed that the user performs the operation on any one (for example, the wireless earphone 10L) of the wireless earphones 10L and 10R. In the description of FIG. 9, the wireless earphone 10L may be replaced with the wireless earphone 10R and applied in the same manner.

In FIG. 9, the earphone control unit 11L of the wireless earphone 10L determines whether the user performs a touch operation on the operation portion OPL of the operation input unit 12L of the wireless earphone 10L (St21). Until it is determined that the user performs the touch operation on the operation portion OPL of the operation input unit 12L of the wireless earphone 10L (NO in St21), the earphone control unit 11L of the wireless earphone 10L repeats the processing of step St21.

When the earphone control unit 11L of the wireless earphone 10L determines that the user performs the touch operation on the operation portion OPL of the operation input unit 12L of the wireless earphone 10L (YES in St21), the earphone control unit 11L of the wireless earphone 10L determines whether the wireless earphone 10L is stored in the earphone storage space SPL of the charging case 30 based on the signal from the charging case storage detection unit 18L (St22). When it is determined that the wireless earphone 10L is stored in the earphone storage space SPL of the charging case 30 (YES in St22), the processing of the wireless earphone 10L proceeds to step St27.

On the other hand, when the earphone control unit 11L of the wireless earphone 10L determines that the wireless earphone 10L is not stored in the earphone storage space SPL of the charging case 30 (NO in St22), the earphone control unit 11L of the wireless earphone 10L determines whether the wireless earphone 10L is inserted (worn) in the user's left ear based on the signal from the wearing sensor 14L (St23). When it is determined that the wireless earphone 10L is not inserted (worn) in the user's left ear (NO in St23), the processing of the wireless earphone 10L proceeds to step St27.

On the other hand, when the earphone control unit 11L of the wireless earphone 10L determines that the wireless earphone 10L is inserted (worn) in the user's left ear (YES in St23), the earphone control unit 11L of the wireless earphone 10L determines a time until the user releases the touch of the touch operation on the operation portion OPL of the operation input unit 12L of the wireless earphone 10L based on the signal from the operation input unit 12 (St24). When it is determined that the time until the user releases the touch of the touch operation on the operation portion OPL is 0.5 seconds to 1 second (0.5 to 1 second in St24), the processing of the wireless earphone 10L returns to step St21.

When the earphone control unit 11L of the wireless earphone 10L determines that the time until the user releases the touch of the touch operation on the operation portion OPL is less than 0.5 seconds (an example of a short touch operation) (less than 0.5 seconds in St24), the earphone control unit 11L of the wireless earphone 10L executes a first predetermined function (for example, pause of play of contents such as music or a moving image being played or release of pause thereof) corresponding to the short touch operation when the user wears the wireless earphone 10L (St25). On the other hand, when the earphone control unit 11L of the wireless earphone 10L determines that the time until the user releases the touch of the touch operation on the operation portion OPL is 1 second or more (an example of a long touch operation) (1 second or more in St24), the earphone control unit 11L of the wireless earphone 10L executes a second predetermined function (for example, a change of a noise cancellation mode, activation of a sound recognition function, and disconnection of incoming call occurring during the call) corresponding to the long touch operation when the user wears the wireless earphone 10L (St26). After steps St25 and St26, the processing of the wireless earphone 10L returns to step St21. In this way, even when the user performs the same operation (for example, the touch operation on the operation portion OPL) (St24), the wireless earphone 10L (including the wireless earphone 10R) can execute different functions according to a time length of the operation (St25 and St26).

Further, when the wireless earphone 10L is in the non-wearing state on the user's left ear (YES in St22 or NO in St23), the earphone control unit 11L of the wireless earphone 10L determines the time until the user releases the touch of the touch operation on the operation portion OPL of the operation input unit 12L of the wireless earphone 10L based on the signal from the operation input unit 12 (St27). When it is determined that the time until the user releases the touch of the touch operation on the operation portion OPL is less than 5 seconds (less than 5 seconds in St27), the processing of the wireless earphone 10L returns to step St21.

On the other hand, when the earphone control unit 11L of the wireless earphone 10L determines that the time until the user releases the touch of the touch operation on the operation portion OPL is 5 seconds or more (5 seconds or more in St27), the earphone control unit 11L of the wireless earphone 10L turns on the short-range wireless communication (for example, Bluetooth (registered trademark)) via the wireless communication unit 19L, and establishes and starts the wireless communication by Bluetooth (registered trademark) with the wireless earphone 10R already taken out from the charging case 30 (St28). Then, the earphone control unit 11L of the wireless earphone 10L shifts (changes) the operation mode of both the wireless earphones 10L and 10R to the pairing mode for pairing with the smartphone 50 (St29). At this time, the earphone control unit 11L of the wireless earphone 10L directly transmits a shift instruction for shifting (changing) to the pairing mode to the wireless earphone 10R. The earphone control unit 11R of the wireless earphone 10R shifts (changes) the operation mode to the pairing mode based on the shift instruction from the wireless earphone 10L.

In response to the transition to the pairing mode in step St29, the earphone control unit 11L of the wireless earphone 10L changes the light-emission color of the LED 131 or the pattern of the lighting (including the blinking) method to the pattern corresponding to the pairing mode and causes the LED 131 to emit the light (St30). In a state in which an output volume from the speaker SPKR of the wireless earphone 10R that is not inserted (worn) is increased (St31), the earphone control unit 11L of the wireless earphone 10L outputs from the speaker SPKR a default sound of a sound message indicating that the wireless earphone 10L is shifted to the pairing mode (St32). When the earphone control unit 11L of the wireless earphone 10L determines that the wireless earphone 10R is inserted (worn) in the user's right ear, the earphone control unit 11L of the wireless earphone 10L may output, from the speaker SPKR, the default sound of the sound message indicating that the pairing mode is shifted in a state in which the output volume of the speaker SPKR of the wireless earphone 10R is kept at a current set value without being increased. After Step St32, the earphone control unit 11L of the wireless earphone 10L performs the pairing that is the known processing with the smartphone 50 (St33). At this time, the earphone control unit 11R of the wireless earphone 10R similarly performs the pairing that is the known processing with the smartphone 50 (St33).

When the earphone control unit 11L of the wireless earphone 10L determines that the pairing in step St33 is completed (YES in St34), the earphone control unit 11L of the wireless earphone 10L completes the pairing mode and returns the operation mode before being shifted to the pairing mode, and returns the lighting (including the blinking) pattern of the LED 131 and the output volume of the speaker SPKL changed in steps St30 and St31 to the original pattern and the original volume value (that is, the pattern and the volume value corresponding to the operation mode before being shifted to the pairing mode by completing the pairing mode) (St35). Until the pairing is completed (NO in St34), the earphone control unit 11L of the wireless earphone 10L continuously performs the pairing that is the known processing with the smartphone 50. In this way, even when the user performs the same operation (for example, the touch operation on the operation portion OPL) (St24 and St27), the wireless earphone 10L (including the wireless earphone 10R) can execute different functions depending on whether the wireless earphone 10L is inserted (worn) in the user's left ear (St25 or St26, St28 to St35). In other words, even when the same operation (for example, the touch operation on the operation portion OPL) is performed, the wireless earphone 10L executes the predetermined function corresponding to the length of the touch operation if the wireless earphone 10L is worn on the user's left ear (St25 and St26), and executes the pairing processing if the wireless earphone 10L is not worn on the user's left ear (St30 to St35).

Accordingly, the wireless earphones 10L and 10R according to the first embodiment includes the wireless communication units 19L and 19R configured to perform wireless communication with the external terminal (for example, the smartphone 50), the detection units (for example, the wearing sensors 14L and 14R or charging case storage detection units 18L and 18R) configured to detect whether the wireless earphones 10L and 10R are worn on the user's ears, the input detection units (for example, the operation input units 12L and 12R) configured to detect the input operation of the user, and the control unit (earphone control units 11L and 11R) configured to transition, based on the detection of the specific input operation (for example, the touch operation) from the user by the input detection unit, the operation mode to the pairing mode in which the pairing related to the wireless communication with the external terminal (for example, the smartphone 50) is performed when the detection units detect that the wireless earphones 10L and 10R are not worn on the user's ears.

Accordingly, the wireless earphones 10L and 10R can support the user to start the pairing sequence between the wireless earphones 10L and 10R and the electronic device (for example, the smartphone 50) to be connected with the wireless earphones 10L and 10R at the necessary timing (for example, any timing at which the user performs a specific operation) while preventing an increase in a material cost for developing the wireless earphones 10L and 10R.

The wireless earphones 10L and 10R further include the speakers SPKL and SPKR. The control units (for example, the earphone control units 11L and 11R) cause the speakers SPKL and SPKR to output a predetermined sound (for example, a sound message including a default sound indicating that the operation mode is shifted to the pairing mode) notifying that the operation mode is shifted to the pairing mode. Accordingly, the user can easily grasp that the pairing mode is shifted, and improvement in convenience can be expected.

The wireless earphones 10L and 10R further include the speakers SPKL and SPKR. The control units (for example, the earphone control units 11L and 11R) cause the speakers SPKL and SPKR to output the predetermined sound (for example, the sound message including the default sound indicating that the operation mode is shifted to the pairing mode) notifying that the operation mode is shifted to the pairing mode at a volume larger than a predetermined value (for example, an initial value or a previous volume value). Accordingly, even when the user is in a noisy environment, the user can easily grasp that the wireless earphones 10L and 10R are shifted to the pairing mode, and the improvement in the convenience can be expected.

The detection units are the storage sensors (for example, the charging case storage detection units 18L and 18R) that detect that the wireless earphones 10L and 10R are stored in the charging case 30 including the storage portions (for example, the earphone storage spaces SPL and SPR) capable of charging the wireless earphones 10L and 10R and storing the housings of the wireless earphones 10L and 10R. Accordingly, the wireless earphones 10L and 10R can be easily determined by detecting whether the wireless earphones 10L and 10R are stored in the charging case 30 as a method of detecting the non-wearing state in which the wireless earphones 10L and 10R are not inserted (worn) into the corresponding ears (the left ear and the right ear) of the user.

The detection units are the infrared sensors that detect the wireless earphones are worn on the user's external ears or auricles. Accordingly, the wireless earphones 10L and 10R can be easily determined based on whether the infrared rays are reflected inside the ear by the infrared sensors provided in the respective wireless earphones 10L and 10R as the method of detecting the non-wearing state in which the wireless earphones 10L and 10R are not inserted (worn) into the corresponding ears (the left ear and the right ear) of the user.

The detection units are the electrostatic sensors that detect the wireless earphones are worn on the user's external ears or auricles. Accordingly, the wireless earphones 10L and 10R can be easily determined based on whether the electrostatic capacitance value is changed by the electrostatic sensors provided in the respective wireless earphones 10L and 10R as the method of detecting the non-wearing state in which the wireless earphones 10L and 10R are not inserted (worn) into the corresponding ears (the left ear and the right ear) of the user.

The input detection units are disposed at one end portions (for example, the end portions of the housings on the sides exposed when the lid 34 is opened) of the housings of the wireless earphones 10L and 10R exposed from the charging case 30 while the other end portions (for example, the end portions of the housings on the sides on which the earpieces EPL and EPR are attached) of the housings of the wireless earphones 10L and 10R are stored in the storage portions (for example, the earphone storage spaces SPL and SPR) (see FIG. 4), and detect a specific input operation when the other end portions (for example, the end portions of the housings on the sides on which the earpieces EPL and EPR are attached) of the housings of the wireless earphones 10L and 10R are stored in the storage portions (for example, the earphone storage spaces SPL and SPR). Accordingly, even when the wireless earphones 10L and 10R are stored in the charging case 30, if the lid 34 is opened, the wireless earphones 10L and 10R can detect the specific input operation (for example, the touch operation on the operation portion OPL) from the user.

The wireless earphones 10L and 10R further include the light emitting elements (for example, the LEDs 131 and 132). The control units (for example, the earphone control units 11L and 11R) are configured to turn on the light emitting elements (for example, the LEDs 131 and 132) in the pairing mode in accordance with a predetermined lighting pattern indicating that the operation mode is in the pairing mode. This allows the user to easily understand that the pairing mode is being performed.

Even when the wireless earphones 10L and 10R are stored in the charging case 30, the light emitting elements (for example, the LEDs 131 and 132) are disposed at any position at which the light from the light emitting elements can be visually recognized by the user. For example, the LEDs 131 and 132 are disposed at end portions of the housings of the wireless earphones 10L and 10R on the sides exposed when the lid 34 of the charging case 30 is opened, or for example, the LEDs 131 and 132 are disposed at any position of the housings of the wireless earphones 10L and 10R at which the light from the LEDs 131 and 132 can be reflected by the inner walls of the earphone storage spaces SPL and SPR.

Accordingly, the user can easily visually recognize that the lighting according to the lighting pattern of the LEDs 131 and 132 is in the pairing mode directly or indirectly (for example, through reflection on the wall surfaces in the earphone storage spaces SPL and SPR).

The wireless earphones 10L and 10R according to the first embodiment are examples of the headphone according to the present disclosure, and include the detection units (for example, the wearing sensors 14L and 14R or the charging case storage detection units 18L and 18R) that detect whether the wireless earphones 10L and 10R are worn on the user's ears, the input detection units (for example, the operation input units 12L and 12R) that detect the input operation from the user, and the control units (for example, the earphone control units 11L and 11R) that execute the processing according to the input operation from the user. The control units (for example, the earphone control units 11L and 11R) execute first processing (for example, the predetermined function corresponding to the short touch operation or the long touch operation) when a first input operation (for example, the touch operation) from the user is detected while it is detected that the wireless earphones are worn on the user's ears, and execute second processing (for example, the pairing with the smartphone 50) different from the first processing when the first input operation (for example, the touch operation) from the user is detected while it is detected that the wireless earphones are not worn on the user's ears.

Accordingly, even when the same operation is received from the user, the wireless earphones 10L and 10R can execute different functions according to the wearing state (that is, the wearing state or the non-wearing state of the wireless earphones 10L and 10R) of the user, and thus the convenience of the user can be improved.

The input detection units (for example, the operation input units 12L and 12R) include the operation portions OPL on which the input operation from the user is performed. The first input operation is any one of the single press operation on the operation portion OPL, the double press operation on the operation portion OPL, the triple press operation on the operation portion OPL, the long press operation in which the operation portion OPL is continuously pressed for a predetermined time (for example, 5 seconds) or more, and the flick operation on the operation portion OPL. Accordingly, the wireless earphones 10L and 10R can execute different functions according to the wearing state (that is, the wearing state or the non-wearing state) of the user by a simple operation (specifically, any one of the single press operation on the operation portion OPL, the double press operation on the operation portion OPL, the triple press operation on the operation portion OPL, the long press operation in which the operation portion OPL is continuously pressed for a predetermined time (for example, 5 seconds) or more, and the flick operation on the operation portion OPL) from the user.

The wireless earphones 10L and 10R further include the wireless communication units 19L and 19R that perform the wireless communication with the external terminal (for example, the smartphone 50). As the second processing, the control units (for example, the earphone control units 11L and 11R) transition the operation mode of the wireless earphones 10L and 10R to the pairing mode in which the pairing for performing the wireless communication between the external terminal (for example, the smartphone 50) and the wireless communication units 19L and 19R can be performed. Accordingly, the wireless earphones 10L and 10R can switch whether to perform the pairing with the smartphone 50 depending on whether the wireless earphones 10L and 10R are wore on the user's ears for convenience.

Although various embodiments have been described above with reference to the accompanying drawings, the present disclosure is not limited to these embodiments. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. Further, constituent elements in the various embodiments described above may be arbitrarily combined within a range not departing from the gist of the invention.

The present disclosure is useful as a wireless headphone and a method for controlling the wireless headphone that support a user to start a pairing sequence between an electronic device and the wireless headphone at a necessary timing while preventing an increase in a material cost.

What is claimed is:

1. A wireless headphone comprising:

a wireless communication unit configured to perform wireless communication with an external terminal;

a detection unit configured to detect that the wireless headphone is worn on an external ear or auricle of a user;

an input detection unit configured to detect an input operation of the user;

a control unit configured to transition, based on detection of a specific input operation from the user by the input detection unit in a state that the detection unit does not detect that the wireless headphone is worn on the external ear or auricle, an operation mode to a pairing mode in which pairing related to the wireless communication with the external terminal is performed; and a speaker, wherein the control unit causes the speaker to output a predetermined sound for notifying that the operation mode is transitioned to the pairing mode, and wherein the control unit causes the speaker to output the predetermined sound at a volume higher when the wireless headphone is not worn on the external ear or auricle than when the wireless headphone is worn on the external ear or auricle.

2. The wireless headphone according to claim 1, wherein the detection unit is an infrared sensor configured to detect that the wireless headphone is worn on the external ear or auricle of the user.

3. The wireless headphone according to claim 1, wherein the detection unit is an electrostatic sensor configured to detect that the wireless headphone is worn on the external ear or auricle of the user.

4. The wireless headphone according to claim 1, wherein the input detection unit is disposed at a first end portion of a housing of the wireless headphone exposed from a charging case while a second end portion of the housing of the wireless headphone is stored in a storage portion, and is configured to detect the specific input operation in a state that the second end portion of the housing of the wireless headphone is stored in the storage portion.

5. The wireless headphone according to claim 1, further comprising:

a light emitting element, wherein the control unit is configured to turn on the light emitting element in the pairing mode in accordance with a predetermined lighting pattern indicating that the wireless headphone is in the pairing mode.

6. The wireless headphone according to claim 5, wherein the light emitting element is disposed at a position of a housing of the wireless headphone at which light from the light emitting element is visible to the user in a state that one end portion of the housing of the wireless headphone is stored in a charging case having a storage portion, the storage portion being capable of charging the wireless headphone and capable of storing the housing of the wireless headphone.

7. A method for controlling a wireless headphone that performs wireless communication with an external terminal, the method comprising:

detecting whether the wireless headphone is worn on an ear of a user;

detecting an input operation of the user;

transitioning, based on detection of a specific input operation from the user in a state that the wireless headphone is not detected as being worn on the ear, an operation mode to a pairing mode in which pairing related to the wireless communication with the external terminal is performed; and causing a speaker to output a predetermined sound for notifying that the operation mode is transitioned to the pairing mode, wherein the predetermined sound is output at a volume higher when the wireless headphone is not worn on the ear or auricle than when the wireless headphone is worn on the ear or auricle.

8. A wireless headphone comprising:

a wireless communication unit configured to perform wireless communication with an external terminal;

a detection unit configured to detect whether the wireless headphone is worn on an ear of a user;

a storage sensor configured to detect whether the wireless headphone is stored in a charging case having a storage portion, the storage portion being capable of storing a housing of the wireless headphone;

an input detection unit configured to detect an input operation of the user;

a control unit configured to transition, based on detection of a specific input operation from the user by the input detection unit in a state that the detection unit detects that the wireless headphone is not worn on the ear and that the storage sensor detects that the wireless headphone is not stored in the charging case, an operation mode to a pairing mode in which pairing related to the wireless communication with the external terminal is performed; and a speaker, wherein the control unit causes the speaker to output a predetermined sound for notifying that the operation mode is transitioned to the pairing mode, and wherein the control unit causes the speaker to output the predetermined sound at a volume higher when the wireless headphone is not worn on the ear or auricle than when the wireless headphone is worn on the ear or auricle.

* * * * *